United States Patent [19]
Guillard et al.

[11] Patent Number: 5,882,373
[45] Date of Patent: Mar. 16, 1999

[54] METHOD OF RUNNING A PLANT COMPRISING A METAL TREATMENT UNIT AND A GAS TREATMENT UNIT

[75] Inventors: Alain Guillard, Paris; Alain Fossier, Sceaux, both of France

[73] Assignee: L'Air Liquide, Societe Anonyme pour l'Etude et l'Exploitation des Procedes Georges Claude, Paris Cedex, France

[21] Appl. No.: 804,983

[22] Filed: Feb. 27, 1997

[30] Foreign Application Priority Data

Mar. 11, 1996 [FR] France ................................. 96 03037

[51] Int. Cl.⁶ ....................................................... C22B 4/00
[52] U.S. Cl. ......................................... 75/10.12; 373/104
[58] Field of Search ............................. 75/10.12; 373/104

[56] References Cited

U.S. PATENT DOCUMENTS 5,538,534  7/1996  Guillard et al. ......................... 266/144
5,643,354  7/1997  Agrawal et al. ........................... 75/490

FOREIGN PATENT DOCUMENTS

| 0 628 778 | 12/1994 | European Pat. Off. . |
| 527 763 | 6/1931 | Germany . |
| 1 219 959 | 6/1966 | Germany . |
| 1 572 204 | 7/1980 | United Kingdom . |

OTHER PUBLICATIONS

J. Ribesse, "Improved efficiency in non–cryogenic oxygen production", *Steel Times –Incorporating Iron & Steel*, vol. 222, No. 10, Oct. 1994, Surrey, Great Britain.

*Primary Examiner*—Melvyn Andrews
*Attorney, Agent, or Firm*—Young & Thompson

[57] ABSTRACT

A gas treatment unit is operated or placed in over-capacity mode during periods of low or zero electrical consumption by a metal treatment unit in order to produce a gas, at least a major part of which is not sent to the metal treatment unit during those periods but is at least temporarily stored in liquid or gas form.

10 Claims, 1 Drawing Sheet

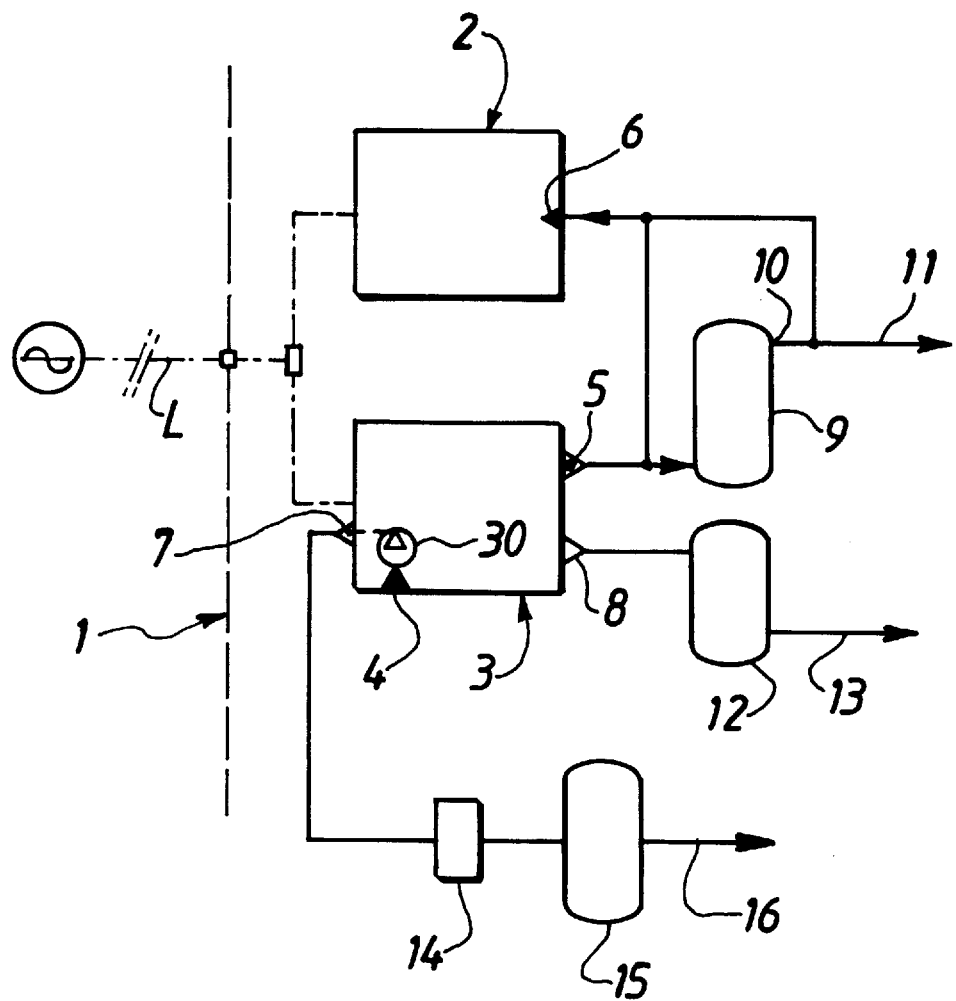

METHOD OF RUNNING A PLANT COMPRISING A METAL TREATMENT UNIT AND A GAS TREATMENT UNIT

BACKGROUND OF THE INVENTION

The present invention relates to metal production plants comprising at least one metal treatment unit, which essentially operates using electricity, and at least one unit for treating at least one gas mixture, which delivers at least one gas to the metal treatment unit and which also operates using electricity.

DESCRIPTION OF THE RELATED ART

Metal treatment units, especially electric furnaces, in particular arc furnaces, are very large consumers of electrical energy, but use this electrical energy in a periodic or indeed erratic manner. Thus, during the course of a year, an arc furnace is only connected to the electricity supply network for approximately two thirds of the time and, during this period of connection, the consumption is far from being steady. Electric furnaces, in particular arc furnaces, are moreover very large consumers of gases, especially oxygen, which are also used periodically and erratically, both in terms of quantity and in duration. As for the gas treatment units, especially gas separation units for delivering industrial gases, these are also large consumers of energy.

The contracts negotiated with the electricity companies for such large energy-consuming plants frequently stipulate a so-called "fixed" chargeable part, generally linked with the maximum subscribed demand, and a so-called "proportional" chargeable part linked to the instantaneous demand, the fixed part being due and paid even for the periods when the arc furnace is not consuming power.

SUMMARY OF THE INVENTION

The object of the present invention is to optimize the energy cost of such combined plants.

To do this, the gas treatment unit is operated, at least partly, during periods of low or zero electrical consumption by the metal treatment unit in order to convert the gas mixture into at least one converted gas, at least some of which is not sent to the metal treatment unit during the said periods.

According to other characteristics of the invention:

at least some of the gas converted during the said periods is stored in gas form and/or in liquid form;

the converted gas is the gas mixture, compressed or liquefied, or a separated gas essentially consisting of one component of the gas mixture;

the gas treatment unit is at least partly a separation unit of the non-cryogenic type, for example an adsorption-type separation unit;

the gas treatment unit is at least partly a separation unit of the cryogenic type;

the gas mixture is air.

It will be understood that, according to the invention, by means of a judicious phase shift between the metal treatment unit and the gas treatment/separation unit, an operation of "resumption" of electrical consumption, unlike the operations of load shedding commonly practiced, is carried out, this operation being compatible with the levels defined for the fixed part. This is because, unlike electricity, the gases may be produced and stored in order to be consumed later, on the site or elsewhere.

BRIEF DESCRIPTION OF THE DRAWINGS

Other characteristics and advantages of the present invention will emerge from the following description of embodiments given by way of purely non-limiting illustration, with reference to the appended drawing in which:

the single figure diagrammatically represents a combined plant consisting of an electric furnace and a gas treatment unit, for implementation of a process according to the invention.

DESCRIPTION OF THE PREFERRED EMBODIMENTS

In this single figure has been shown, by way of example, on a site delimited by a boundary line 1, a metal treatment unit 2, in this case an electric furnace, and a unit 3 for separating a gas mixture introduced via an inlet 4 and delivering, at at least one outlet 5, at least one gas sent to an inlet 6 of the furnace 2. The furnace 2 and the unit 3 are supplied with electric current delivered, via a supply line L, typically by a local electricity company.

Typically, the furnace 2 is an arc furnace and the separation unit 3 delivers, using air introduced at 4, oxygen at its outlet 5 and, depending on the type of unit 3, nitrogen, either pure or impure, or argon at another outlet 8.

According to one aspect of the invention, the outlet 5 of the unit 3 is connected to a storage device 9 having at least one outlet 10 capable of being connected to the inlet 6 of the furnace 2 or to a distribution line 11 to another user station. Similarly, the outlet 8 is connected to a storage device 12 having an outlet connected to a distribution line 13.

The unit 3 may also deliver, at an outlet 7, air overcompressed by a compressor 30 and coming from the inlet 4. This compressed air is liquefied in a liquefier 14, coupled for example to a cold-gas circuit of the unit 3, and then stored in liquid form in an insulated tank 15 in order subsequently to be used, reheated, via a network 16, at user stations on the site.

It will be understood that, as mentioned earlier, when the furnace 2 operates at low or zero electric power, the unit 3 is operated or placed in over-capacity mode in order to produce and store and/or distribute the gases available at its outlets 5, 7 and 8, without affecting the overall electrical energy consumption of the plant. On the other hand, when the furnace 2 is operating at high power or at maximum power, the unit 3 is operated at reduced capacity and the gas requirements of the furnace 2 may be provided by the storage device 9 supplementing the part delivered by the unit 3 operating at reduced capacity.

The separation unit 3 may be of the cryogenic type with a distillation column, the gases produced being advantageously in liquid form in order to make it easier to store them. The short periods of inactivity of the furnace 2 are moreover advantageously put to good use in order to regenerate the feed-air purification bottles of the cryogenic separation unit.

The separation unit 3 may also be of the pressure-swing or temperature-swing adsorption type, its operation, in phase shift with that of the furnace 2, producing at least one gas, typically medium-purity oxygen, which is compressed before being stored in the corresponding storage device 9 or 12.

Finally, the separation unit 3 may consist of two "subunits", one being of the cryogenic type and the other of the adsorption type. Typically, it may be imagined starting up the adsorption unit during periods in which the furnace is operating at reduced or zero capacity: in this case, the cryogenic unit may be undersized with respect to the requirements of the furnace, the balance being provided by the product which is stored in the device 9 and replenished during each period when the electric furnace is operating at reduced or zero capacity.

We claim:

1. A method of running a metal production plant comprising the steps of:

operating at least one metal treatment unit using electricity;

operating at least one gas treatment unit, using electricity, for treating at least one gas mixture, the one gas treatment unit delivering at least one gas to the metal treatment unit;

during periods of low or zero electrical consumption by the metal treatment unit, operating the gas treatment unit to convert the gas mixture into at least one converted gas, at least part of which converted gas is not sent to the metal treatment unit during the periods of low or zero electrical consumption by the metal treatment unit.

2. The method of claim 1, further comprising the step of storing some of the converted gas.

3. The method of claim 2, wherein the converted gas is stored in gas form.

4. The method of claim 2, wherein the converted gas is stored in liquid form.

5. The method of claim 1, wherein said step of converting the gas mixture into at least one converted gas provides the converted gas as a compressed gas mixture.

6. The method of claim 1, wherein said step of converting the gas mixture into at least one converted gas provides the converted gas as a separated gas consisting essentially of one component of the gas mixture.

7. The method of claim 1, wherein said step of operating at least one gas treatment unit to convert the gas mixture into at least one converted gas, further comprises the step of operating a non-cryogenic separation unit.

8. The method of claim 1, wherein said step of operating at least one gas treatment unit to convert the gas mixture into at least one converted gas, further comprises the step of operating a adsorption separation unit.

9. The method of claim 1, to convert the gas mixture into at least one converted gas, wherein said step of operating at least one gas treatment unit, further comprises the step of operating a cryogenic separation unit.

10. The method of claim 1, wherein said step of converting the gas mixture into at least one converted gas utilizes air as the gas mixture.

* * * * *